US012584354B2

(12) United States Patent
Brandon

(10) Patent No.: US 12,584,354 B2
(45) Date of Patent: Mar. 24, 2026

(54) LADDER MOUNTED SECURING DEVICE FOR PREVENTING SLIPPAGE OF LADDER DURING USE

(71) Applicant: Danny Brandon, Manchester, TN (US)

(72) Inventor: Danny Brandon, Manchester, TN (US)

(*) Notice: Subject to any disclaimer, the term of this patent is extended or adjusted under 35 U.S.C. 154(b) by 642 days.

(21) Appl. No.: 17/983,690

(22) Filed: Nov. 9, 2022

(65) Prior Publication Data

US 2023/0143839 A1 May 11, 2023

Related U.S. Application Data

(60) Provisional application No. 63/278,264, filed on Nov. 11, 2021.

(51) Int. Cl.
*E06C 7/18* (2006.01)
*E06C 1/12* (2006.01)

(52) U.S. Cl.
CPC ................ *E06C 7/188* (2013.01); *E06C 1/12* (2013.01)

(58) Field of Classification Search
CPC ... E06C 1/34; E06C 7/18; E06C 7/188; E06C 1/12; A62B 35/0093; E04G 21/3204
See application file for complete search history.

(56) References Cited

U.S. PATENT DOCUMENTS

| | | | | |
|---|---|---|---|---|
| 5,282,520 A * | 2/1994 | Walker | E06C 1/39 | 182/21 |
| 9,631,428 B2 * | 4/2017 | Niemela | E06C 7/188 | |
| 2013/0105247 A1 * | 5/2013 | Casebolt | A62B 35/0093 | 188/185 |
| 2014/0262616 A1 * | 9/2014 | Cullum | E06C 7/188 | 242/384.7 |
| 2018/0051515 A1 * | 2/2018 | Crawford | E06C 7/188 | |
| 2021/0170208 A1 * | 6/2021 | Sun | A62B 1/10 | |

FOREIGN PATENT DOCUMENTS

| | | | |
|---|---|---|---|
| CA | 3068015 C * | 10/2021 | |
| WO | WO-02059444 A1 * | 8/2002 | E06C 1/34 |

* cited by examiner

*Primary Examiner* — Theodore V Adamos
(74) *Attorney, Agent, or Firm* — Price Heneveld LLP

(57) ABSTRACT

A ladder securing device includes a housing that has a rotating interface configured to attach to a portion of a ladder. The housing is rotationally operable between an attaching position and a bypass position. A reel is disposed within the housing, and includes a strap that is selectively extendable to a plurality of extended positions. The reel biases the strap to a coiled position around a spool of the reel and within the housing. A retainer is attached to an end of the strap, and is configured to attach to one of the ladder and the housing in a securing position that secures the ladder to an adjacent support structure.

20 Claims, 9 Drawing Sheets

Method 400 for Securing a Ladder to a Support Structure Using a Securing Device

LADDER MOUNTED SECURING DEVICE FOR PREVENTING SLIPPAGE OF LADDER DURING USE

CROSS REFERENCE TO RELATED APPLICATION

This application claims the benefit under 35 U.S.C. § 119(e) to U.S. Provisional Patent Application No. 63/278,264, filed Nov. 11, 2021, entitled "LADDER MOUNTED SECURING DEVICE FOR PREVENTING SLIPPAGE OF LADDER DURING USE," which is incorporated herein by reference in its entirety.

FIELD OF THE DISCLOSURE

The present invention is directed toward a securing device that is attached to a ladder, and more specifically, a securing device that extends from a ladder to secure the ladder to a support structure to prevent slippage of the ladder during use.

BACKGROUND OF THE DISCLOSURE

Use of ladders in the field can present certain dangers where the ladder is not properly secured to a particular structure or on a particular terrain. Where a ladder is placed on a slope, the ladder can slip away from a support structure while the person is on the ladder. This is particularly true of tall ladders and extension ladders. Other dangers can include a ladder falling away from the support structure, where a ladder may be positioned in close proximity to the support structure.

SUMMARY OF THE DISCLOSURE

According to an aspect of the present disclosure, a ladder securing device includes a housing that has a rotating interface configured to attach to a portion of a ladder. The housing is rotationally operable between an attaching position and a bypass position. A reel is disposed within the housing, and includes a strap that is selectively extendable to a plurality of extended positions. The reel biases the strap to a coiled position around a spool of the reel and within the housing. A retainer is attached to an end of the strap, and is configured to attach to one of the ladder and the housing in a securing position that secures the ladder to an adjacent support structure.

According to another aspect of the present disclosure, a ladder includes a base section. A fly section slidably operates relative to the base section to define a desired height of an engaging end of the fly section. A housing has a rotating interface configured to attach to a portion of the base section. The housing is rotationally operable between an attaching position and a bypass position. The housing in the bypass position is positioned within a storage space defined between adjacent rungs and opposing side rails of the base section. A reel is disposed within the housing, and includes a strap that is selectively extendable to a plurality of extended positions. The reel biases the strap to a coiled position around a spool of the reel and within the housing. A retainer is attached to an end of the strap, and is configured to attach to one of the base section and the housing in a securing position that secures the ladder to an adjacent support structure. The securing position is further defined by the strap being rotationally secured in a desired extended position of the plurality of extended positions.

According to yet another aspect of the present disclosure, a method for securing an extension ladder to an adjacent support structure includes the steps of operating a fly section of the extension ladder relative to a base section of the extension ladder to define a desired length, positioning the ladder against a support structure, rotating a housing for a ladder securing device from a bypass position to an attaching position, extending a strap from a coiled position within the housing to a desired extended position to be encircled around the structure, attaching a retaining of the strap in the desired extended position to the base section, retracting the strap to eliminate slack in the strap encircling the support structure, activating a reel lock that secures a rotational position of the reel of the housing and secures the strap in the desired extended position, disengaging the reel lock to allow the reel to bias the strap back to a coiled position within the housing, and rotating the housing from the attaching position to the bypass position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
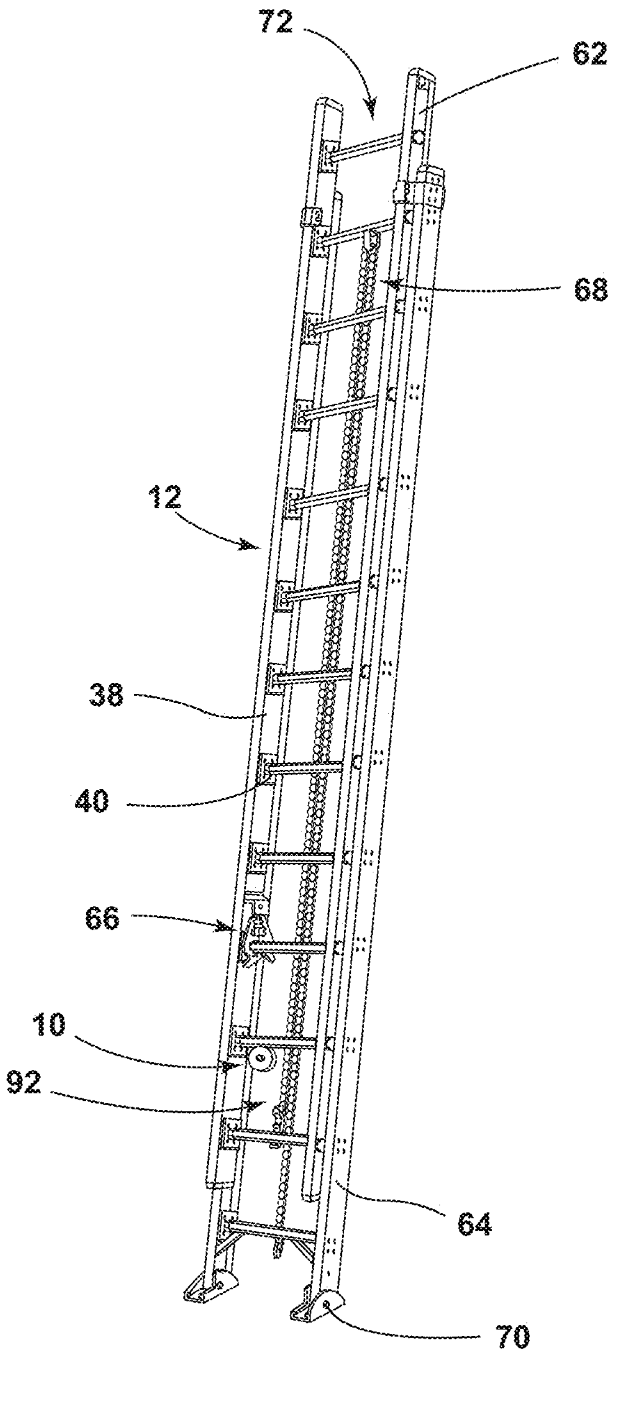
FIG. 1 is a perspective view of an extension ladder that incorporates an aspect of the ladder securing device.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a ladder securing apparatus that maintains the position of a ladder with respect to a support substrate. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-8, reference numeral 10 generally refers to a securing device that is attached to a ladder 12 for securing the ladder 12 to an adjacent support structure 14. The adjacent support structure 14 can include, but is not limited to, a tree, a utility pole, a fence, a wall, or other similar structure that a ladder 12 can be leaned against to allow a worker or other individual to climb the ladder 12. According to the various aspects of the device, the securing device 10 for the ladder 12 includes a housing 16 having a rotating interface 18 that is configured to attach to a portion of the ladder 12. The housing 16 is rotationally operable between an attaching position 20 and a bypass position 22. A reel 24 is disposed within the housing 16. The reel 24 includes a strap 26 and a biasing mechanism 28. The biasing mechanism 28 is disposed proximate the reel 24 and biases the reel 24, and, in turn, the strap 26 to a coiled position 30 around a spool 32 of the reel 24 and within the housing 16. A retainer 34 is attached to an outer end 36 of the strap 26. The retainer 34 is configured to attach to a portion of the ladder 12 or a portion of the housing 16 for the securing device 10. Typically, the retainer 34 will attach to a side rail 38 of the ladder 12 or a rung 40 of the ladder 12. The bypass position 22 of the housing 16 is configured to place the housing 16 in alignment with one of the rungs 40 of the ladder 12. Conversely, the attaching position 20 of the housing 16 orients the housing 16 to be perpendicular to the rung 40 of the ladder 12.

Referring again to FIGS. 1-4, the ladder 12, typically in the form of an extension ladder 12, can extend to a significant height to allow a user to climb and access various locations that are a significant distance above the ground 60. An extension ladder 12 typically includes a fly section 62 that is slidably operable relative to a base section 64 where each of the fly section 62 and base section 64 include opposing side rails 38 and a plurality of rungs 40 that extend between the side rails 38. As the fly section 62 slidably operates relative to the base section 64, the extension ladder 12 increases or decreases in length or height of an engaging end 72 of the fly section 62 depending on the orientation of the ladder 12. The engaging end 72 of the fly section 62 is typically configured to rest against or otherwise engage the adjacent support structure 14. Certain ladders 12 can have additional features such as a rung lock 66 that secures the fly section 62 to the base section 64 at a particular height. A rope and pulley system 68 is typically included within longer models of extension ladders 12.

The base section 64 of the extension ladder 12 can include various feet 70 or anti-slip features that can be used to secure the ladder 12 to a substrate, such as the ground 60. While these anti-slip features are useful on stable substrates, such as concrete, structural floors, and other level surfaces, these feet 70 may have difficulty in securing the ladder 12 within open terrain, gravel and other non-paved surfaced or other non-finished surfaces. Accordingly, the securing device 10 is attached to the ladder 12, typically within the base section 64, for securing the ladder 12 to the adjacent support structure 14 to address possible slippage of the ladder 12 away from the adjacent support structure 14 or falling of the ladder 12 away from the adjacent support structure 14.

The securing device 10 is attached to a side rail 38 of the base section 64 for a ladder 12 using a bracket 90 that can be attached via the fasteners, welding, or other similar securing mechanism or method and can fixedly secure the bracket 90 to the side rail 38. The housing 16 is attached to the bracket 90 via the rotating interface 18, such as a hinge, that allows the housing 16 to move between the attaching position 20 and the bypass position 22. The rotating interface 18 can also include an articulating mechanism that selectively biases the housing 16 at least toward the bypass position 22 and, in certain aspects of the device, the attaching position 20. This articulating mechanism can also be used to selectively and temporarily secure the housing 16 in the attaching position 20 and the bypass position 22. The housing 16 in the bypass position 22 is typically oriented and positioned within a storage space 92 that is defined between adjacent rungs 40 of the base section 64 and opposing side rails 38 of the base section 64 for the extension ladder 12. When in use, the securing device 10 for the ladder 12 can be rotated from the bypass position 22 to the attaching position 20. In this manner, the housing 16 is rotated to extend outward from the storage space 92 that is defined between the adjacent rungs 40 and side rails 38 for the base section 64 of the ladder 12. In addition, the attaching position 20 orients the housing 16 to extend from the storage space 92. In certain aspects of the device, such as particularly long extension ladders 12, each of the base section 64 and the fly section 62 can include a dedicated securing device 10. These securing devices 10 can be used to provide multiple layers of support for securing the ladder 12 to the support structure 14.

Figure 2:
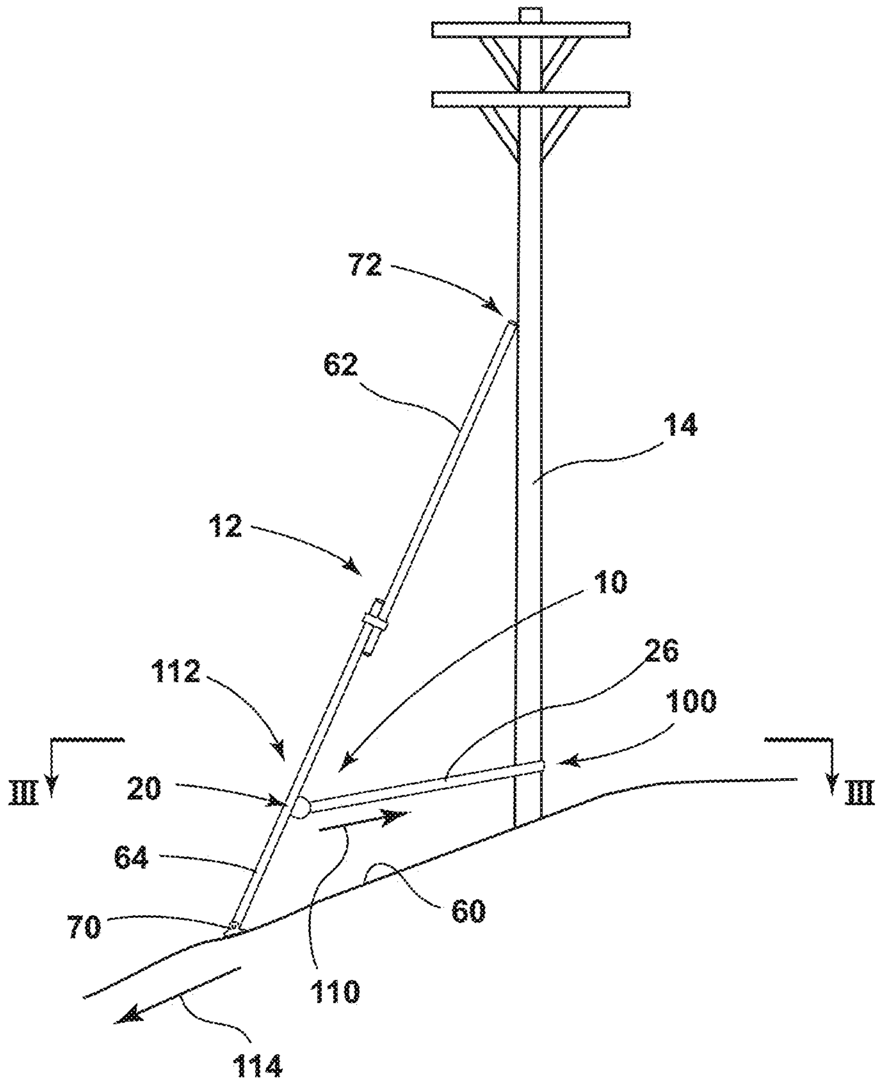
FIG. 2 is a schematic perspective view of a ladder positioned against an adjacent support structure and having the ladder securing device engaged with the adjacent support structure.
Figure 3:
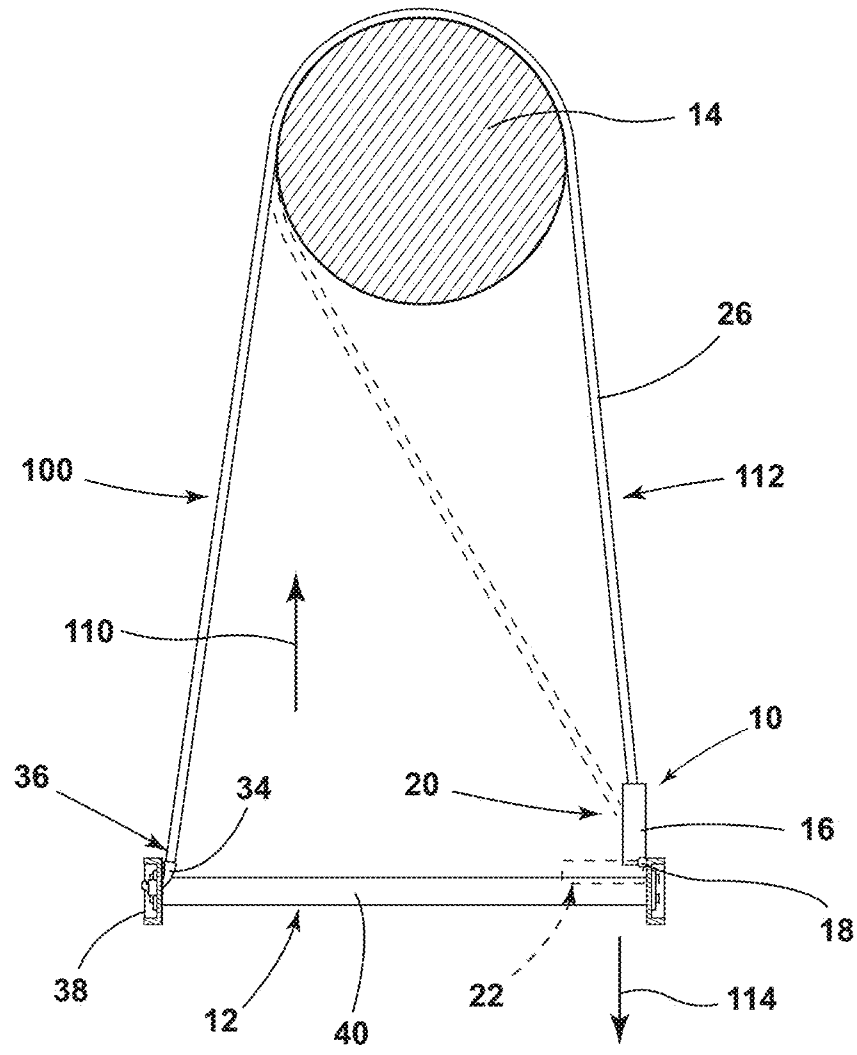
FIG. 3 is a cross-sectional view of the ladder and ladder securing structure of FIG. 2 taken along line III-III.
Figure 4:
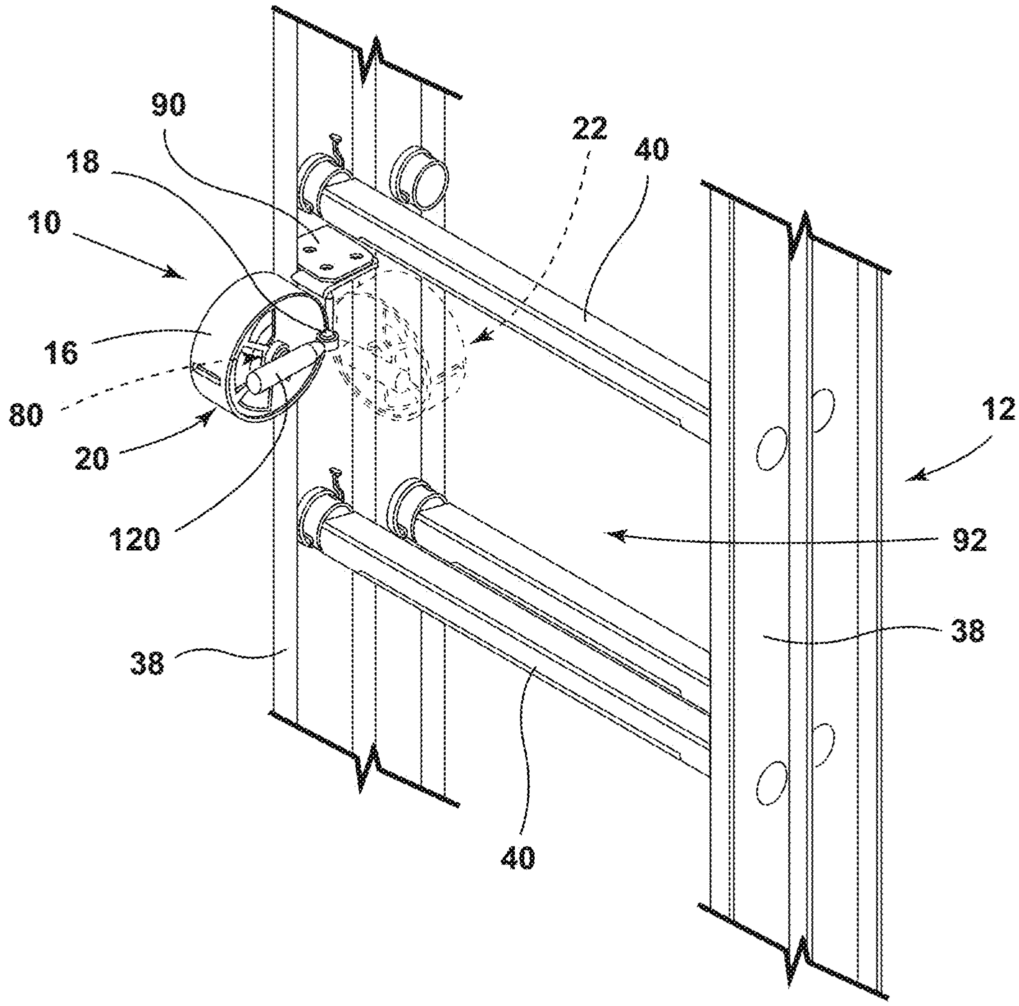
FIG. 4 is a perspective view of a portion of a ladder that incorporates an aspect of the ladder securing device and shown in each of the attaching position and the bypass position.
Figure 5:
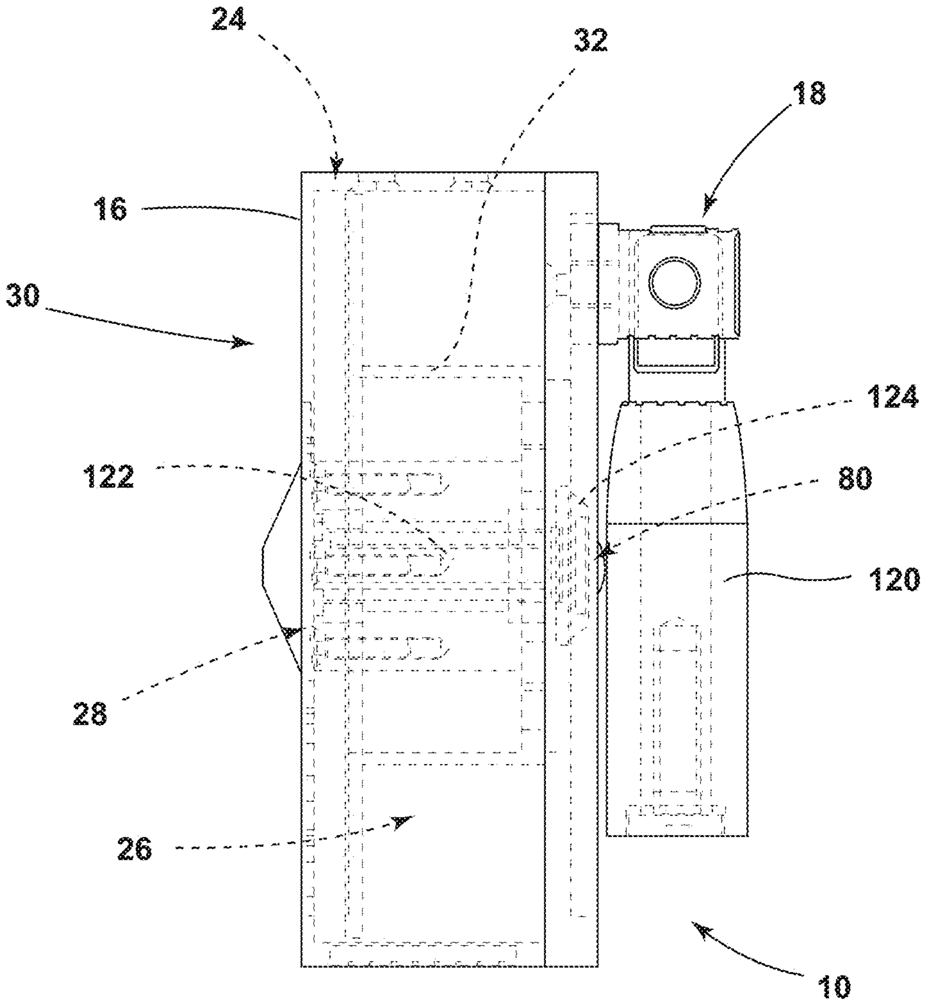
FIG. 5 is a side elevational view of an aspect of the ladder securing device separated from a ladder.
Figure 6:
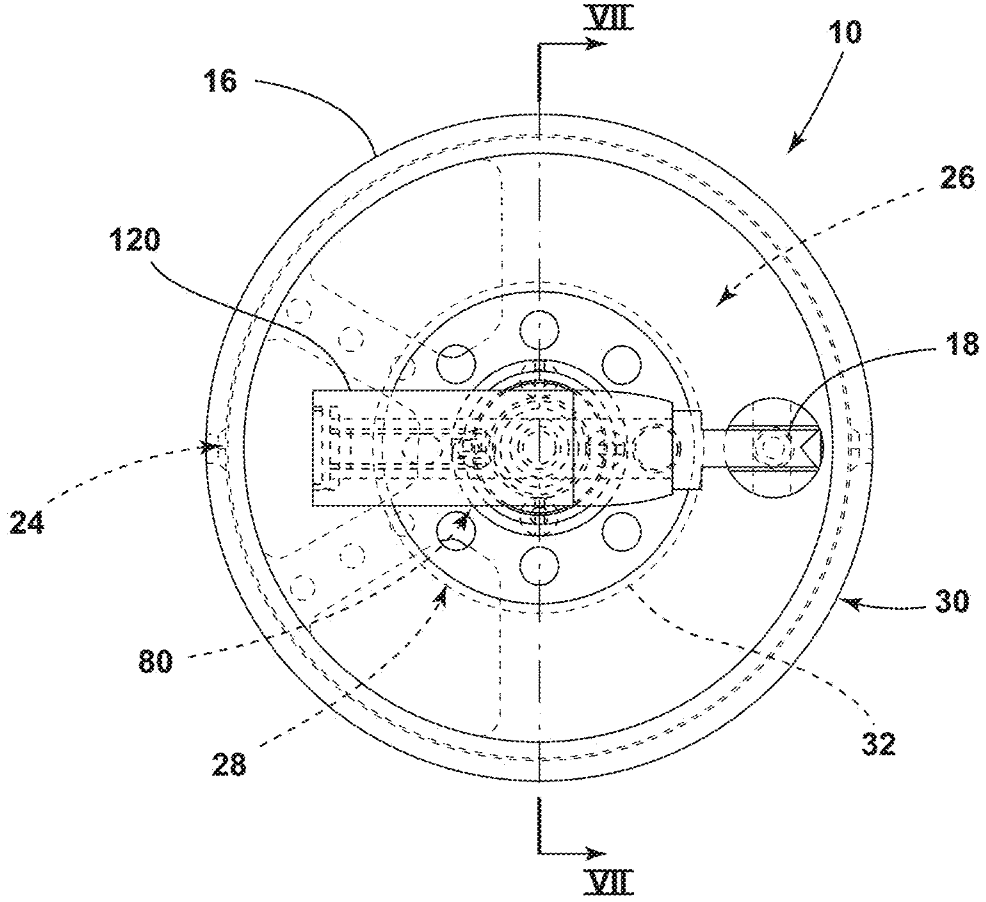
FIG. 6 is a side perspective view of the ladder securing device of FIG. 5.
Figure 7:
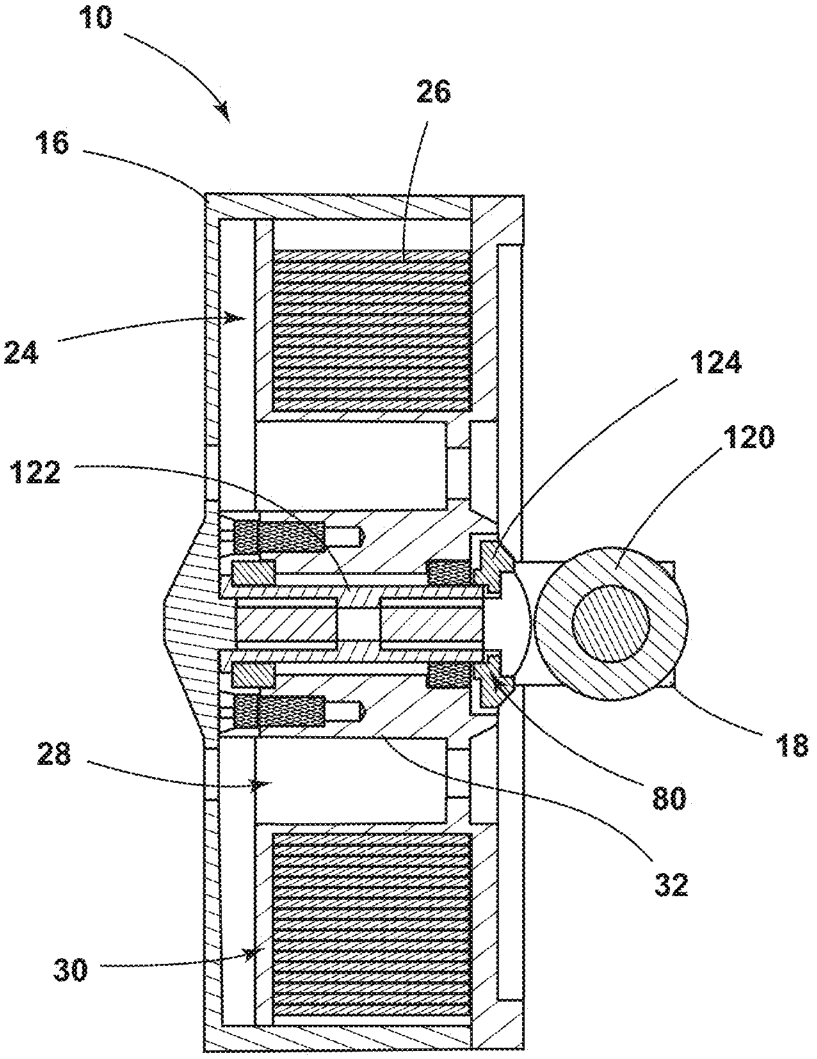
FIG. 7 is a cross-sectional view of the ladder securing device of FIG. 6 taken along line VII-VII.
Figure 8:
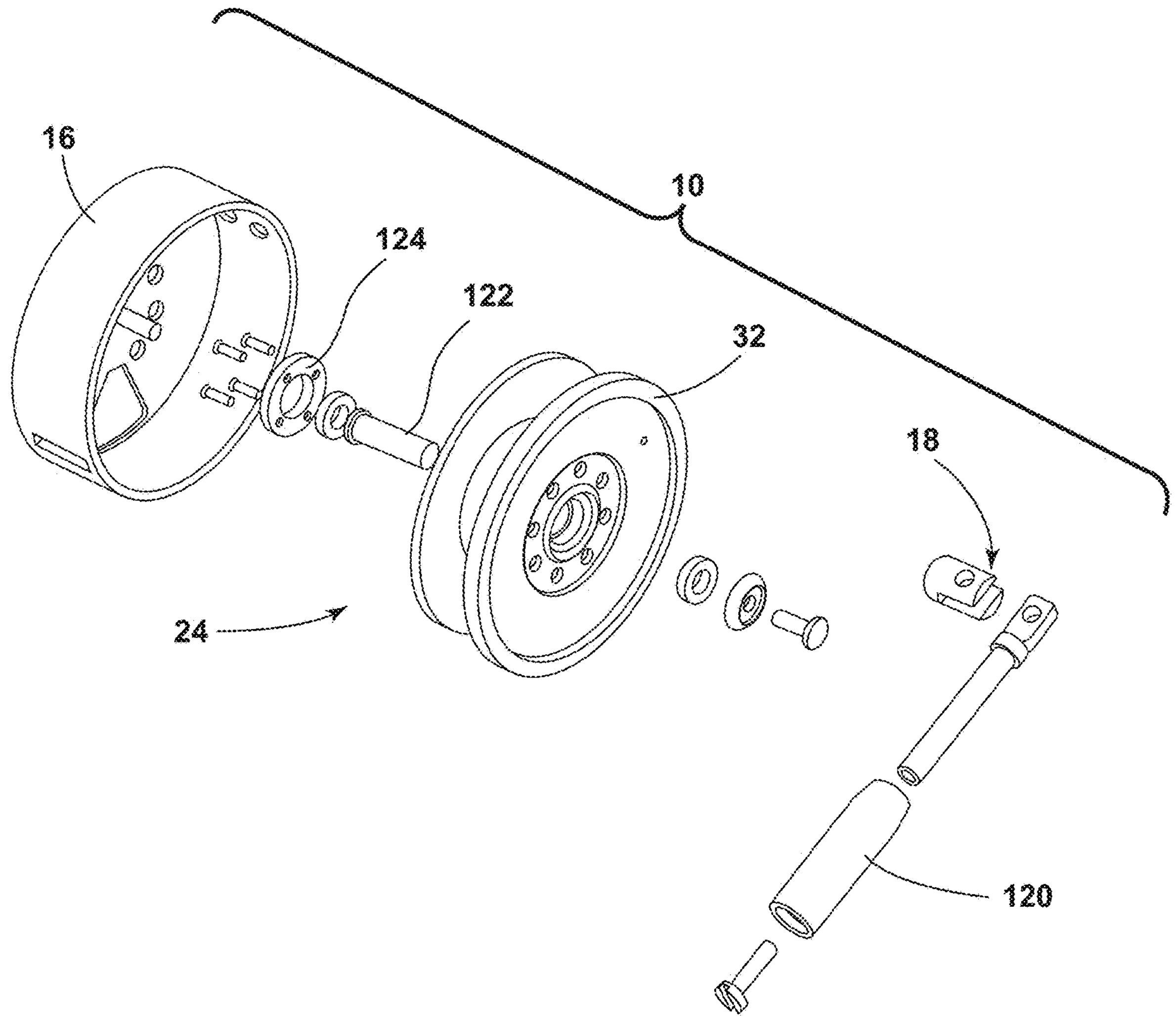
FIG. 8 is an exploded perspective view of the ladder securing device of FIG. 5.
Figure 9:
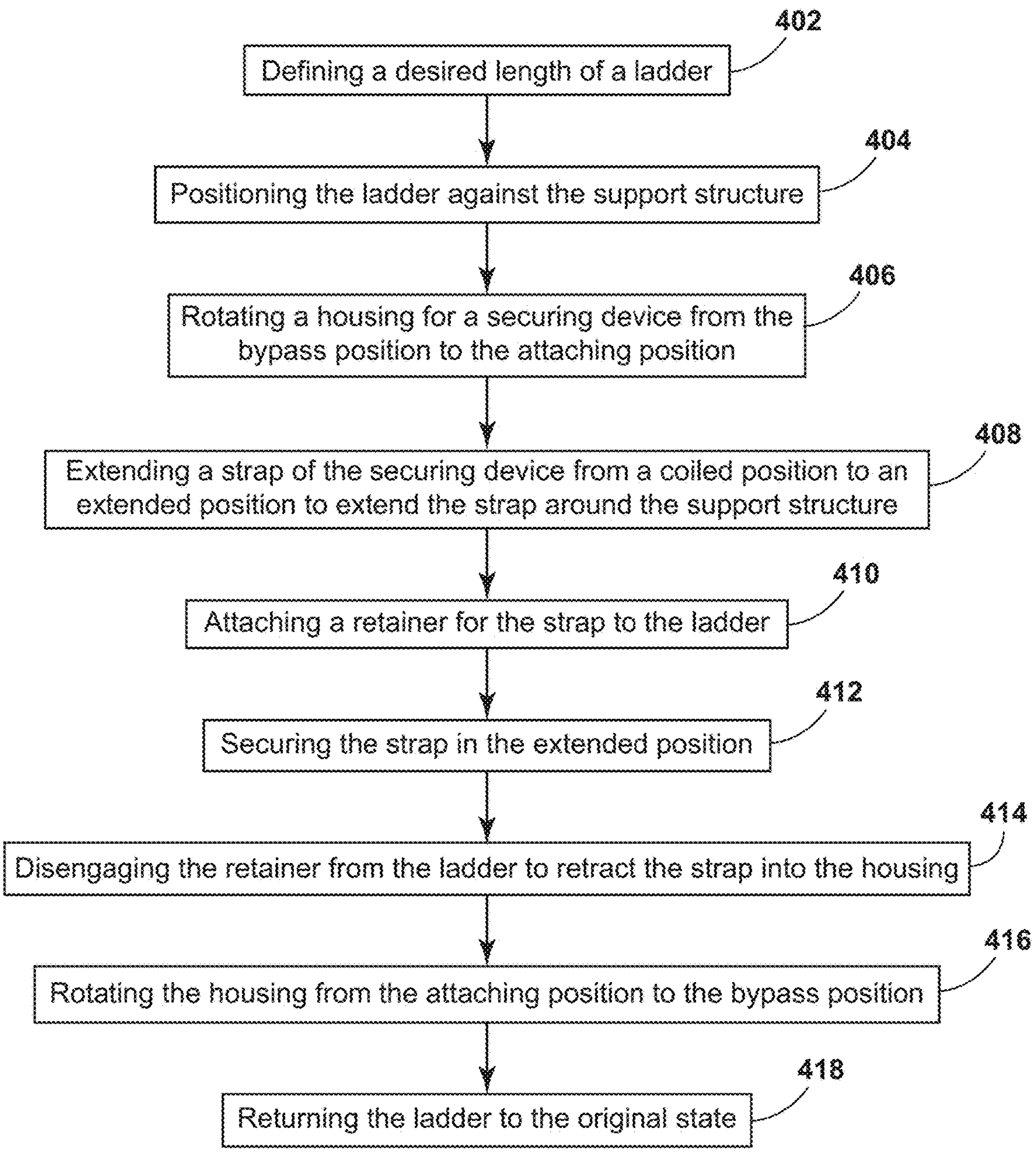
FIG. 9 is a linear flow diagram illustrating a method for securing a ladder to an adjacent support structure.

As exemplified in FIGS. 2-4, the strap 26 can be in a coiled position 30 within the housing 16 and around the reel 24 that is positioned within the housing 16. As discussed herein, the strap 26 is biased toward the coiled position 30 using the biasing mechanism 28. This biasing mechanism 28 is typically in the form of a rotationally-operable spring, such as a clock spring, or other similar spirally-wound spring. When the ladder 12 is to be attached to a support structure 14, the strap 26 is selectively extendable from the reel 24 and the housing 16 and can be placed around the support structure 14 in an extended position 100. In this manner, the strap 26 can be used to encircle or partially encircle the adjacent support structure 14, in an encircling position, to maintain the ladder 12 is a consistent relative position with respect to the adjacent support structure 14. The retainer 34 that is attached to the outer end 36 of the strap 26 is secured to a portion of the ladder 12. The biasing mechanism 28 included within the reel 24 serves to take up any excessive slack that may be present within the strap 26 when the retainer 34 is attached to the ladder 12. In addition, the securing device 10 can include a locking mechanism 80, such as a reel lock that secures the strap 26 in the extended position 100 and prevents further extension of the strap 26 away from the desired extended position 100. This locking mechanism 80 can also include a ratcheting mechanism that allows for incremental retracting movements of the strap 26 with respect to the reel 24.

As exemplified, in FIGS. 2 and 3, when the strap 26 is secured around the support structure 14, the strap 26 defines a retaining force 110 that prevents slippage or falling of the ladder 12 away from the support structure 14. This is particularly useful in conditions where the ladder 12 is placed on an unstable surface, such as gravel, or on a sloped surface where the ladder 12 may tend to slide away from the support structure 14. Using the strap 26, the base section 64 of the ladder 12 can be secured to the support structure 14 to prevent slippage away from the support structure 14. In addition, the positioning of the securing device 10 prevents the ladder 12 from rotating away from the support structure 14.

Where the ladder 12 is placed on a slope, certain slippage may occur when the securing device 10 is engaged with the support structure 14 in a securing position 112. This slippage, due to the presence of the securing device 10, can be limited to a small range of slippage. As the ladder 12 slides away from the support structure 14, the retainer 34, the strap 26 and the housing 16 of the securing device 10 limits the outward movement 114 of the base section 64 away from the support structure 14. Accordingly, the base section 64 of the ladder 12 can only move a small distance from the support structure 14. At this point, the strap 26 is made even more taught and the ladder 12 is made secure to prevent further slippage or other outward movement 114 away from the support structure 14.

Referring again to FIGS. 2-4, the strap 26 for the securing device 10 can be attached to a side rail 38 for the ladder 12 via the reel 24 and the housing 16. In addition, the retainer 34 for the strap 26 can also be attached to the rung 40 of the ladder 12 as well as a portion of the housing 16 for the securing device 10. Typically, the retainer 34 will be attached to the side rail 38 of the ladder 12, where the ladder 12 is shaped and configured to a specific portion of the side rail 38. The retainer 34 can be configured to attach to a connection between a rung 40 and a side rail 38. In such an aspect of the device, the connection between the rung 40 and the ladder 12 can include a recess within which the retainer 34 can engage the ladder 12.

Referring now to FIG. 4, the housing 16 for the securing device 10 is positioned within the storage space 92 to allow for manipulation of the fly section 62 of the ladder 12 relative to the base portion of the ladder 12, without interference from the housing 16 relative to the securing device 10. In this manner, a ladder 12 can be manufactured with an aspect of the securing device 10 or retrofitted with an aspect of the securing device 10. Accordingly, the securing device 10 will be readily available for use each time the ladder 12 is utilized for accessing higher areas of a support structure 14. When the ladder 12 is in the proper or desired length (or height), the engaging end 72 of the ladder 12 can be positioned against the support structure 14. At this point, when the ladder 12 is properly configured as desired or according to the needs of the user, the housing 16 for the securing device 10 can be rotated from the bypass position 22 to the attaching position 20. When in the attaching position 20, the strap 26 in the coiled position 30 can be extended from the housing 16 and the reel 24 within the housing 16. The strap 26 is then moved to an extended position 100 and placed around the support structure 14 and secured to an opposing side rail 38 for the base section 64 of the ladder 12. It is contemplated the the extended position 100 of the strap 26 can be a desired extended position 100 that is one of a plurality of extended positions 100. The length of the desired extended position 100 can depend on the size of the adjacent support structure 14, the distance the ladder 12 is from the adjacent support structure 14 and other similar considerations.

A reel lock or other locking mechanism 80 can be used to secure the reel 24 and the strap 26 in a particular extended position 100. The reel lock that maintains the position of the reel 24 and prevents further outward extension of the strap 26 can be automatically engaged via a tensioning mechanism or an internal actuator. The reel lock can also be manually engaged by the user to secure the position of the reel 24 and the strap 26 relative to the housing 16, the support structure 14 and the remainder of the ladder 12. After use of the ladder 12 is completed, the reel lock can be disengaged, and the strap 26 can be retracted back into the housing 16 and around the reel 24 using the biasing mechanism 28 contained within the housing 16. The housing 16 can then be rotated from the attaching position 20 back to the bypass position 22 and the ladder 12 can be retracted back to its original compact state.

Referring to FIGS. 5-8, the securing device 10 can include the housing 16 that can be attached to a rotating handle 120 that extends from the bracket 90 to the housing 16. This rotating handle 120 can include the rotating interface 18 and extends between the housing 16 and the bracket 90 to allow for rotational operation of the securing device 10 between the attaching position 20 and the bypass position 22. The reel 24 typically rotationally operates relative to the housing 16 to allow for extension and retraction of the strap 26 between the coiled position 30 and any one of the various extended positions 100 that can be used to secure the ladder 12 to the support structure 14. Various reel pins 122 and reel bushings 124 are used to attach the reel 24 to the housing 16 to secure the reel 24 within the housing 16 and also to provide for rotational operation of the reel 24 relative to the housing 16.

According to various aspects of the device, the strap 26 is typically made of a vinyl or nylon fabric that is generally inelastic or substantially inelastic. The strap 26 is sturdy to account for the tension-type retaining force 110 that may be experienced when the securing device 10 is in use for securing the ladder 12 to the support structure 14. Also, the material of the strap 26 is be sturdy to withstand scratching, friction, and other abuse-type loads experienced when the strap 26 is extended and retracted from the housing 16 and also when the strap 26 is in use.

According to various aspects of the device, use of the securing device 10 for the ladder 12 can provide for an additional safety feature of the ladder 12 when used in the field. The securing device 10 is attached to the ladder 12 and is conveniently accessible for use in many conditions. The securing device 10 can be used in connection with a support structure 14, such as a utility pole, that the strap 26 can extend around to attach to the side rail 38 of the ladder 12. It is also contemplated that the securing device 10 can be used in connection with other support structures 14 that the strap 26 may not be able to extend around. The retainer 34 can include any one of various shapes that can be used to attach to larger support structures 14, such as walls, large posts and other structures. Where a larger support structure 14 is present, the retainer 34 can be used to attach directly to the support structure 14.

In addition, use of a ladder 12 in the field typically requires one or more people at the base of the ladder 12 to monitor the ladder 12 and prevent the ladder 12 from sliding or falling away from the support structure 14. Use of the securing device 10 can, in certain conditions, be used by a single person. When the ladder 12 is secured to the support structure 14 using the strap 26 of the securing device 10, the ladder 12 is prevented or substantially prevented from sliding away from the support structure 14. Accordingly, a single individual can use the ladder 12, in conjunction with the support device, when in the field. Typically, at least one other person will be present when using the ladder 12 as an additional layer of safety when using the ladder 12 in the field. The securing device 10 provides a primary safety feature to prevent the ladder 12 from sliding away from the support structure 14 while a person is on the ladder 12.

Referring now to FIGS. 1-9, having described various aspects of the securing device 10 for the ladder 12, a method 400 is disclosed for securing a ladder 12 to a support structure 14. According to the method 400, the fly section 62 and the base section 64 of the ladder 12 are operated relative to one another to define a desired length (step 402). Once in the desired length, the ladder 12 is positioned against the support structure 14 (step 404). The housing 16 for the securing device 10 is rotated from the bypass position 22 to the attaching position 20 (step 406). The strap 26 is then extended from the coiled position 30 within the housing 16 and is moved to the extended position 100 to be wrapped around the support structure 14 (step 408). The retainer 34 for the strap 26 is attached to the ladder 12 and the biasing mechanism 28 of the reel 24 takes up or generally eliminates slack present within the strap 26 (step 410). The reel 24 within the housing 16 is then secured in a rotational position by activating a reel lock or other locking mechanism 80 that prevents further extension of the strap 26 from the reel 24 (step 412). After use of the ladder 12 is complete, the retainer 34 is disengaged from the ladder 12 and retracted back into the housing 16 and around the reel 24 (step 414). The housing 16 can then be rotated from the attaching position 20 back to the bypass position 22 (step 416). The ladder 12 can then be retracted back to its original state (step 418).

Utilizing the various aspects of the device, the securing device 10 for the ladder 12 can be used in the field to prevent slippage of the ladder 12 away from a support structure 14 or unintentional rotation or falling of the ladder 12 away from the support structure 14. The securing device 10 can provide users of the ladder 12 with peace of mind and confidence that the ladder 12 will be secured against the support structure 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A ladder securing device comprising:

a housing having a rotating interface that is attached to a portion of a ladder, the housing being rotationally operable between an attaching position and a bypass position;

a reel that is disposed within the housing, wherein the reel includes a strap that is selectively extendable to a plurality of extended positions, wherein the reel biases the strap to a coiled position around a spool of the reel and within the housing; and a retainer that is attached to an end of the strap, wherein the retainer is configured to attach to one of the ladder and the housing in a securing position that secures the ladder to an adjacent support structure, wherein the bypass position orients the housing to be parallel with and positioned between adjacent rungs of the ladder, and wherein the attaching position orients the housing to be perpendicular to the adjacent rungs of the ladder.

2. The ladder securing device of claim 1, wherein the securing position is further defined by the strap being rotationally secured in a desired extended position of the plurality of extended positions.

3. The ladder securing device of claim 1, wherein the ladder is an extension ladder that includes a fly section that slidably operates relative to a base section to define a desired height of the extension ladder, wherein the housing in the bypass position is positioned within a storage space defined between the adjacent rungs and opposing side rails of the base section of the extension ladder.

4. The ladder securing device of claim 3, wherein the housing in the attaching position orients the housing to extend from the storage space.

5. Ladder securing device of claim 3, wherein the strap is configured to be placed around the adjacent support structure, and attach to one of the ladder and the housing to define the securing position, wherein the strap secures the base section of the ladder relative to the adjacent support structure and prevents feet of the ladder from slipping relative to the adjacent support structure.

6. The ladder securing device of claim 1, wherein the rotating interface includes an articulating securing mechanism that selectively biases the housing toward one of the bypass position and the attaching position.

7. The ladder securing device of claim 1, wherein the securing position is defined by the strap encircling the adjacent support structure to prevent movement of the ladder away from the adjacent support structure.

8. The ladder securing device of claim 1, wherein the housing is attached to a side rail of opposing side rails of the ladder within a storage space defined between the adjacent rungs and the opposing side rails of the ladder.

9. The ladder securing device of claim 1, wherein the reel includes a biasing spring that biases the strap toward the coiled position.

10. The ladder securing device of claim 9, wherein the reel includes a selectively operable ratcheting lock that selectively locks a rotational position of the reel to secure the strap in a desired extended position.

11. A ladder comprising:

a base section;

a fly section that slidably operates relative to the base section to define a desired height of an engaging end of the fly section;

a housing having a rotating interface that is configured to attach to a portion of the base section, the housing being rotationally operable between an attaching position and a bypass position, wherein the housing in the bypass position is positioned within a storage space defined between adjacent rungs and opposing side rails of the base section, wherein the bypass position is configured to place the housing in alignment with the adjacent rungs of the base section, and wherein the attaching position orients the housing to be perpendicular to the adjacent rungs of the base section;

a reel that is disposed within the housing, wherein the reel includes a strap that is selectively extendable to a plurality of extended positions, wherein the reel biases the strap to a coiled position around a spool of the reel and within the housing; and a retainer that is attached to an end of the strap, wherein the retainer is configured to attach to one of the base section and the housing in a securing position that secures the ladder to an adjacent support structure, wherein the securing position is further defined by the strap being rotationally secured in a desired extended position of the plurality of extended positions.

12. The ladder of claim 11, wherein the housing in the attaching position orients the housing to extend from the storage space.

13. The ladder of claim 11, wherein the strap is configured to be placed around the adjacent support structure, and attach to the base section to define an encircling position, wherein the strap secures the base section of the ladder relative to the adjacent support structure and prevents feet of the base section from slipping relative to the adjacent support structure.

14. The ladder of claim 11, wherein the rotating interface of the housing includes an articulating securing mechanism that selectively biases the housing at least toward the bypass position and the attaching position.

15. The ladder of claim 11, wherein the securing position is defined by the strap encircling the adjacent support structure to prevent movement of the ladder away from the adjacent support structure.

16. The ladder of claim 11, wherein the reel includes a ratcheting lock that selectively locks a rotational position of the reel to secure the strap in the desired extended position of the plurality of extended positions.

17. The ladder of claim 11, wherein the housing is attached to a side rail of the opposing side rails.

18. The ladder of claim 11, wherein the reel includes a biasing mechanism that biases the strap toward the coiled position.

19. A method for securing an extension ladder to an adjacent support structure, the method comprising steps of:

operating a fly section of the extension ladder relative to a base section of the extension ladder to define a desired length;

positioning the ladder against a support structure;

rotating a housing for a ladder securing device from a bypass position to an attaching position, wherein the bypass position is configured to place the housing in alignment with adjacent rungs of the base section, and wherein the attaching position orients the housing to be perpendicular to the adjacent rungs of the base section;

extending a strap from a coiled position within the housing to a desired extended position to be encircled around the support structure;

attaching a retainer of the strap in the desired extended position to the base section;

retracting the strap to eliminate slack in the strap encircling the support structure;

activating a reel lock that secures a rotational position of a reel of the housing and secures the strap in the desired extended position;

disengaging the reel lock to allow the reel to bias the strap back to a coiled position within the housing; and rotating the housing from the attaching position to the bypass position.

20. The method of claim 19, wherein the step of attaching the retainer of the strap in the desired extended position includes placing the retainer of the strap around the support structure and attaching the retainer of the strap to the base section to define an encircling position, wherein the strap secures the base section of the ladder relative to the support structure and prevents feet of the base section from slipping relative to the support structure.

* * * * *